United States Patent
Shin

(10) Patent No.: US 7,317,490 B2
(45) Date of Patent: Jan. 8, 2008

(54) APPARATUS AND METHOD FOR PERFORMING MULTI-PICTURE IN A DISPLAY DEVICE

(75) Inventor: Soo Min Shin, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 516 days.

(21) Appl. No.: 10/915,477

(22) Filed: Aug. 11, 2004

(65) Prior Publication Data

US 2005/0036068 A1  Feb. 17, 2005

(30) Foreign Application Priority Data

Aug. 13, 2003 (KR) ...................... 10-2003-0055939

(51) Int. Cl.
*H04N 5/45* (2006.01)

(52) U.S. Cl. ................. 348/565; 348/473; 348/731

(58) Field of Classification Search ............... 348/564, 348/563, 584, 588, 565, 569, 570, 734, 566–568, 348/731, 732, 473, 474; 725/39, 41, 49, 725/53

See application file for complete search history.

(56) References Cited

U.S. PATENT DOCUMENTS 5,537,153 A * 7/1996 Shigihara ..................... 725/56
6,405,371 B1 * 6/2002 Oosterhout et al. ........... 725/39

FOREIGN PATENT DOCUMENTS

CN  1291404  4/2001

* cited by examiner

*Primary Examiner*—M. Lee
(74) *Attorney, Agent, or Firm*—KED & Associates LLP

(57) ABSTRACT

An apparatus and method for performing a multi-picture in a display device are disclosed. The apparatus includes a demodulation unit demodulating a plurality of broadcast signals, which include video signals, audio signals, and supplementary information including genre information, a video processing unit converting at least one of the video signals into data representing a displayable main picture and data representing one or more displayable sub-pictures, and a controller selecting at least one of the video signals corresponding to at least one selected genre based on the demodulated genre information, wherein the controller controls the video processing unit to convert the video signals corresponding to the selected genre into the sub-picture data.

20 Claims, 5 Drawing Sheets

APPARATUS AND METHOD FOR PERFORMING MULTI-PICTURE IN A DISPLAY DEVICE

This application claims the benefit of Korean Application No. P2003-55937, filed on Aug. 13, 2003, which is hereby incorporated by reference.

BACKGROUND OF THE INVENTION

1. Field of the Invention

The present invention relates to a display device, and more particularly, to an apparatus and a method for performing a multi-picture in a display device.

2. Discussion of the Related Art

As television broadcasting services have changed from the analog mode to the digital mode, the technologies in televisions have been greatly improved and developed both in quality and quantity. More specifically, the digital mode can operate a larger number of channels as compared to the analog mode, thereby providing an increased number of channels for television broadcasting. Also, the digital mode television provides the users with high resolution images of high definition (HD) quality.

Recently, in order to meet with the demands of the users, household television receivers have become slimmer for space efficiency, and the television screen has become wider for an increased real-life vision. In addition, digital televisions are currently being developed so that a plurality of other input signals other than broadcast signals, such as signals from personal computers, can be displayed simultaneously. For example, a television performs a multi-picture operation, which includes a plurality of screens. People watch their favorite TV show on a main picture and roll other TV shows on sub pictures. That is, the people can watch what they like while they search for other favorite TV shows. According to the related art, the multi-picture operation was performed by selecting all video signals and displaying them all on the sub pictures with a tuner or a plurality of the tuners. However, a downside of the related art is that it randomly shows all TV shows which a channel map stores. The map channel stores all the channels of the TV without specifying their genres. Not specifying their genres has caused inconvenience that the people had no choice but to roll all the channels on the sub pictures, even though they only want to roll a specific genre of the TV shows. For example, a person is watching an LA Lakers basketball game but also wants to know who is winning in an LA Dodgers baseball game. Even though the person only wants to roll sports channels on the sub pictures, the person has to roll all the channels such as news channels and drama channels in accordance with the related art.

SUMMARY OF THE INVENTION

Accordingly, the present invention is directed to an apparatus and method for performing a multi-picture in a display device that substantially obviates one or more problems due to limitations and disadvantages of the related art.

An object of the present invention is to provide an apparatus and method that displays broadcasting programs or channels corresponding to genres selected by a user on sub-pictures.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for performing a multi-picture includes a demodulation unit demodulating a plurality of broadcast signals, which include video signals, audio signals, and supplementary information including genre information, a video processing unit converting at least one of the video signals into data representing a displayable main picture and data representing one or more displayable sub-pictures, and a controller selecting at least one of the video signals corresponding to at least one selected genre based on the demodulated genre information, wherein the controller controls the video processing unit to convert the video signals corresponding to the selected genre into the sub-picture data.

The video processing unit comprises a first video processor converting one of the video signals into the main picture data, one or more second video processors converting the video signals corresponding to the selected genres into the sub-picture data, and a multiplexer combining the main picture data and the sub-picture data according to a control signal of the controller.

The video processing unit converts video signals inputted from one or more external devices into the main picture data and/or the sub-picture data. The external device is a camcorder, digital video disc (DVD) player, a video cassette recorder (VCR), or a personal computer (PC).

The controller provides a user with a sub-picture setting menu for selecting genres of broadcasting programs or channels to be displayed on the sub-pictures. The sub-picture setting menu includes a selectable option for selecting a number of the sub-pictures to be displayed and a plurality of selectable options for controlling a size and a position of the sub-picture.

The controller either selects the genres of broadcasting programs or channels to be displayed on the sub-pictures according to a frequency of the user's previous selections of broadcasting programs or channels, or selects the genres of broadcasting programs or channels to be displayed on the sub-pictures according to a genre of a broadcasting program or a channel displayed on the main picture.

The apparatus of the present invention further comprises a memory storing the selected genres and a codec encoding and decoding the video signals, the audio signals, and the supplementary information.

In another aspect of the present invention, A method for performing a multi-picture in a display device includes receiving a plurality of broadcast signals, which include video signals, audio signals, and supplementary information including genre information; selecting video signals corresponding to at least one selected genre based on the genre information; and converting one of the demodulated video signals into data representing a displayable main picture and converting the selected video signals corresponding to the selected genre into data representing one or more displayable sub-pictures.

The method further comprises selecting the genres of broadcasting programs or channels to be displayed on the sub-pictures. The step of selecting the genres comprises providing a user with a sub-picture setting menu for selecting the genres of the broadcasting programs or the channels to be displayed on the sub-pictures; and selecting the genres by using the sub-picture setting menu. Furthermore, the step of selecting the genres either comprises selecting the genres according to a frequency of the user's previous selections of broadcasting programs or channels, or selecting the genres according to a genre of a broadcasting program or a channel displayed on the main picture.

The method further comprises selecting a number of the sub-pictures to be displayed or controlling sizes and positions of the sub-pictures, and comprises assigning pixel addresses of a display unit to the main picture data and the sub-picture data and combining the main picture data and the sub-picture data according to the pixel addresses.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
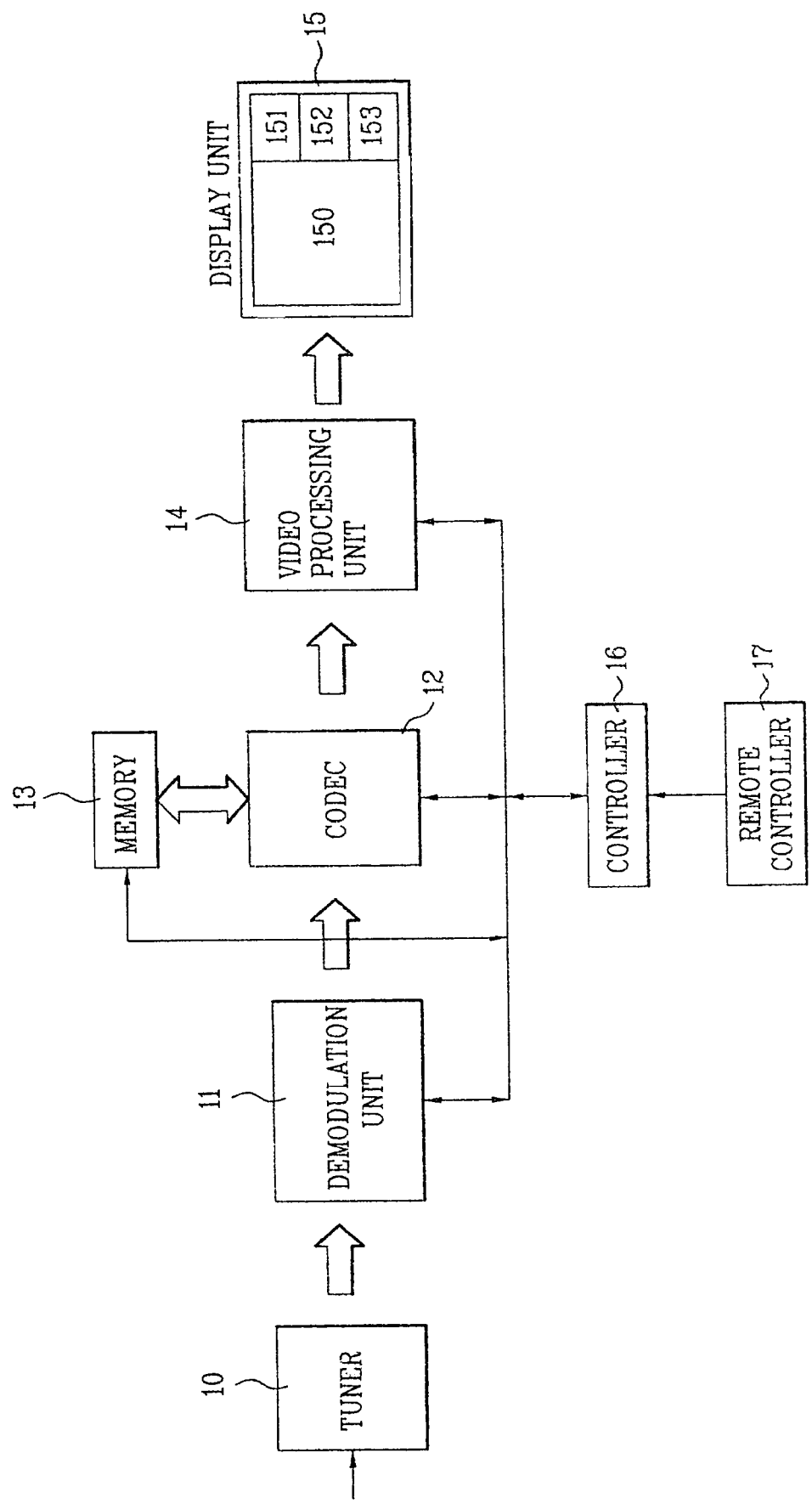
FIG. 1 illustrates a block diagram showing an apparatus for performing a multi-picture operation in accordance with the present invention.

FIG. 1 illustrates a block diagram showing an apparatus of performing a multi-picture operation in accordance with the present invention. Referring to FIG. 1, the apparatus includes one or more tuners 10, which receives TV broadcast signals and selects at least one of the TV broadcast signals in order to select user's favorite broadcasting programs or channels. The tuner 10 provides the selected TV broadcast signals to a demodulation unit 11. The demodulation unit 111 demodulates and/or detects video signals, audio signals, and supplementary information included in the TV broadcast signals. Herein, the video signals include a first video signal for displaying a main picture 150, and one or more second video signals for displaying one or more sub-pictures 151, 152, 153. The supplementary information includes program information including resolution levels of the selected broadcasting programs, and genre information representing genres of the selected broadcasting programs or the selected channels, such as drama, sports, movie and documentary.

A codec 12 receives the video signals, the audio signals, and the supplementary information from the demodulation unit 11, and encodes and decodes the video signals, the audio signals, and the supplementary information. The codec 12 supplies the decoded video signals to a video processing unit 14, the decoded audio signals to a audio processing unit (not shown), and the supplementary information to a memory 13 and a controller 16.

The video processing unit 14 receives the decoded first video signal and the decoded second video signals from the codec 12, respectively. In order to display the main picture and the sub-pictures on a display unit 15 according to a control signal from the controller 16, the video processing unit 14 converts the decoded first video signal into displayable main picture data and converts the decoded second video signals into displayable sub-picture data. The video processing unit 14 then combines the main picture data and the sub-picture data and assigns pixel addresses of the display unit 15 to the main picture data and the sub-picture data, and supplies the combined main picture data and sub-picture data to the display unit 15. Moreover, the video processing unit 14 converts video signals inputted from one or more external device (such as camcorder, digital video disc (DVD) player, PC, VCR, and etc.) into the main picture data and/or the sub-picture data.

The display unit 15 receives the combined main picture data and sub-picture data, and displays the main picture 150 and the sub-pictures 151, 152, 153. The display unit 15 may be CRT, PDP, LCD, or the like.

The controller 16 identifies the genre information of the received TV broadcast signals, and controls the tuner 10 to select at least one of the received TV broadcast signals according to the genre information. That is, the controller 16 finds out and selects the broadcasting programs or the channels corresponding to the predetermined genres.

The present invention is capable of grouping and displaying the TV channels based on a user's preference. In order to roll the channels, the user manipulates the interface or the remote controller 17 and the user's order is transmitted to the controller 16. The controller 16 then stores the user's preferred channels or programs in the memory 13. For example, if the user wants to see sitcoms such as Friends and Seinfield on the sub-picture 151, then TV of the present invention only shows such sitcoms on the sub-picture 151.

Figure 2:
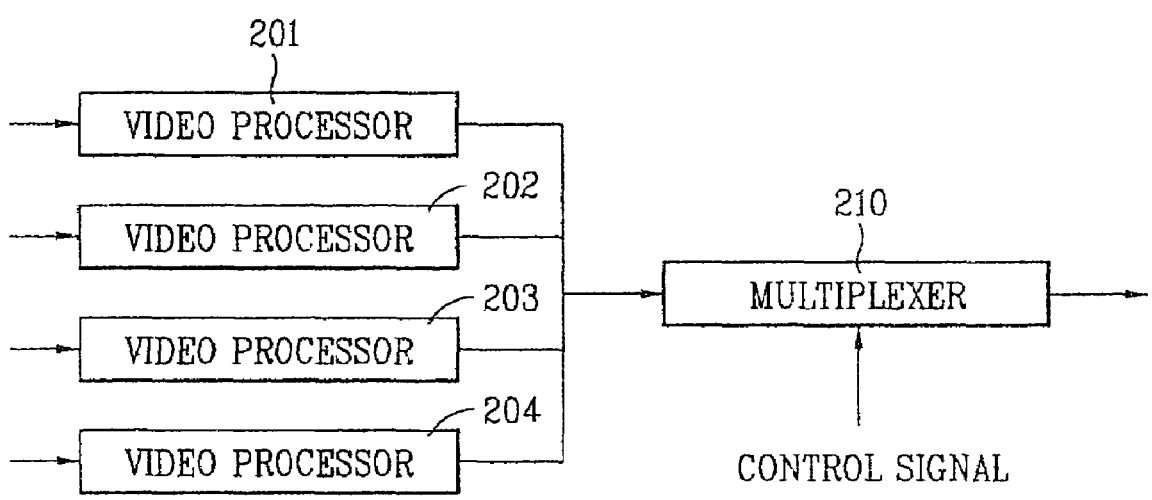
FIG. 2 illustrates example of a video processing unit illustrated in FIG. 1.

FIG. 2 illustrates a block diagram showing an example of a detailed structure of the video processing unit 14. Referring to FIG. 2, a first video processor 201 receives the decoded first video signal from the codec 12 and converts the decoded first video signal into the displayable main picture data. Second video processors 202, 203, 204 receive the decoded second video signals from the codec 12, respectively, and convert the decoded second video signals into the displayable sub-picture data. A Multiplexer 210 receives the main picture data from the first video processor 201 and receives the sub-picture data from the second video processors 202, 203, 204. The Multiplexer 210 then combines the main picture data and the sub-picture data depending upon the pixel addresses of the main picture 150 and the sub-picture 151, 152, 153.

The method for processing a multi-picture according to the present invention will now be described in detail.

Figure 3:
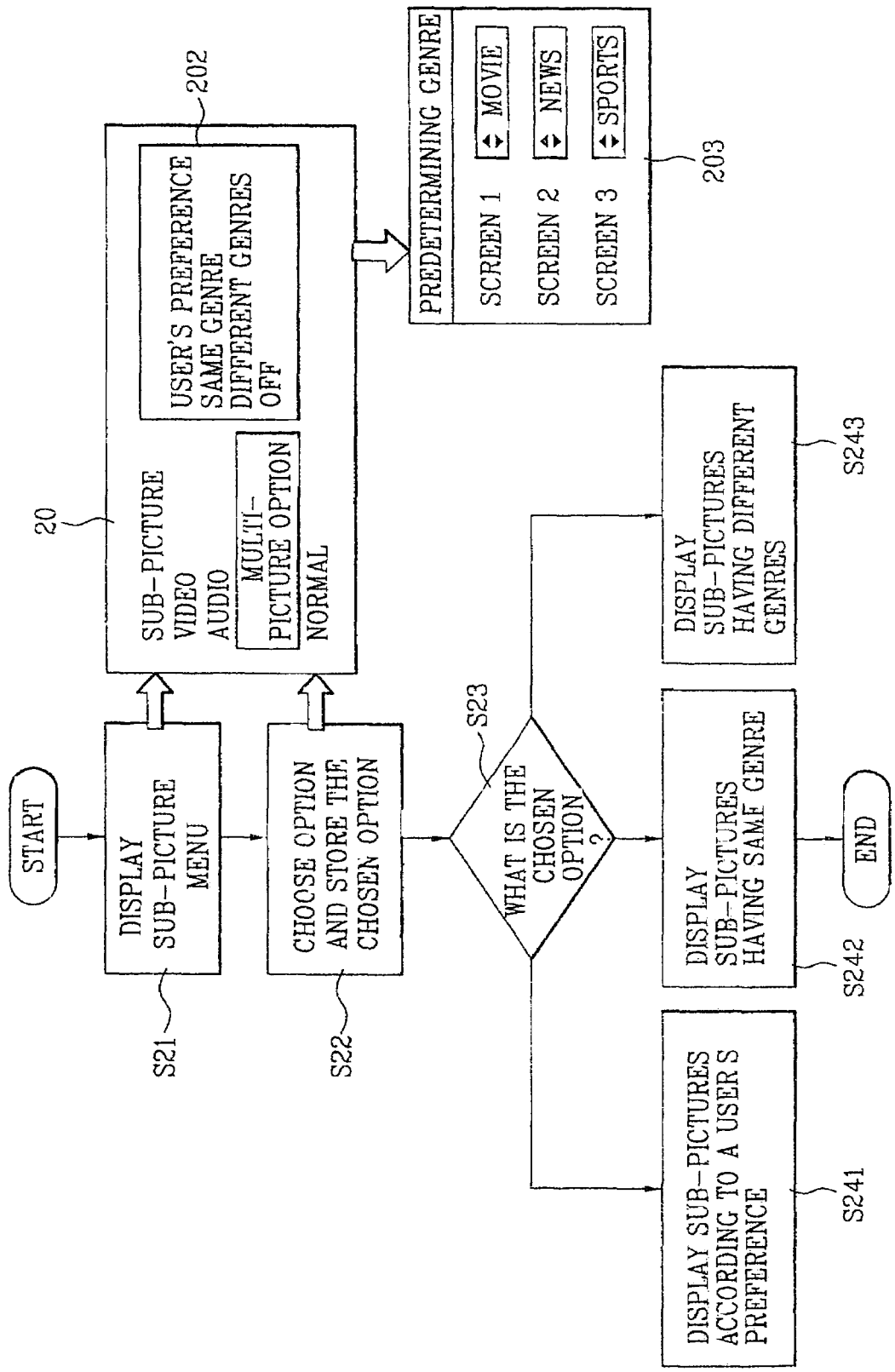
FIG. 3 illustrates a flowchart of a method for performing a multi-picture in accordance with the present invention.

FIG. 3 illustrates a flowchart of performing a multi-picture operation in accordance with the present invention. Referring to FIG. 3, the controller 16 displays a "sub-picture setting menu" 20 if the user desires to utilize the multi-picture operation (S21). The user may select options related the sub-pictures by using the sub-picture setting menu 20. The multi-picture setting menu 20 includes a list of selectable options such as "Sub-picture", "Video", "Audio", "Special multi-picture option", and "Normal".

If the user selects the "Sub-picture", the controller 16 displays selectable options for selecting a number of the sub-pictures to be displayed on the display unit 15 and for controlling a size and a position of the sub-picture. The user then may select the number of the sub-pictures and the sizes and positions of the sub-pictures. For example, when the user selects the "size" selectable option in the sub-picture setting menu, an "Enlarge" button and a "Reduce" button are displayed on the display unit 15. When the user selects the Enlarge button by using the remote controller 17, the size of the sub-picture is increased. Conversely, when the user selects the Reduce button, the size of the sub-picture is decreased.

If the user selects the "Video", the controller 16 provides the user with selectable options for selecting or setting resolution levels of the sub-pictures and controlling chromaticity and brightness of the sub-picture. If the user selects the "Audio", the controller 16 provides the user with options for determining whether to output the sounds corresponding to the sub-pictures or not and controlling a volume of the sounds.

Figure 4:
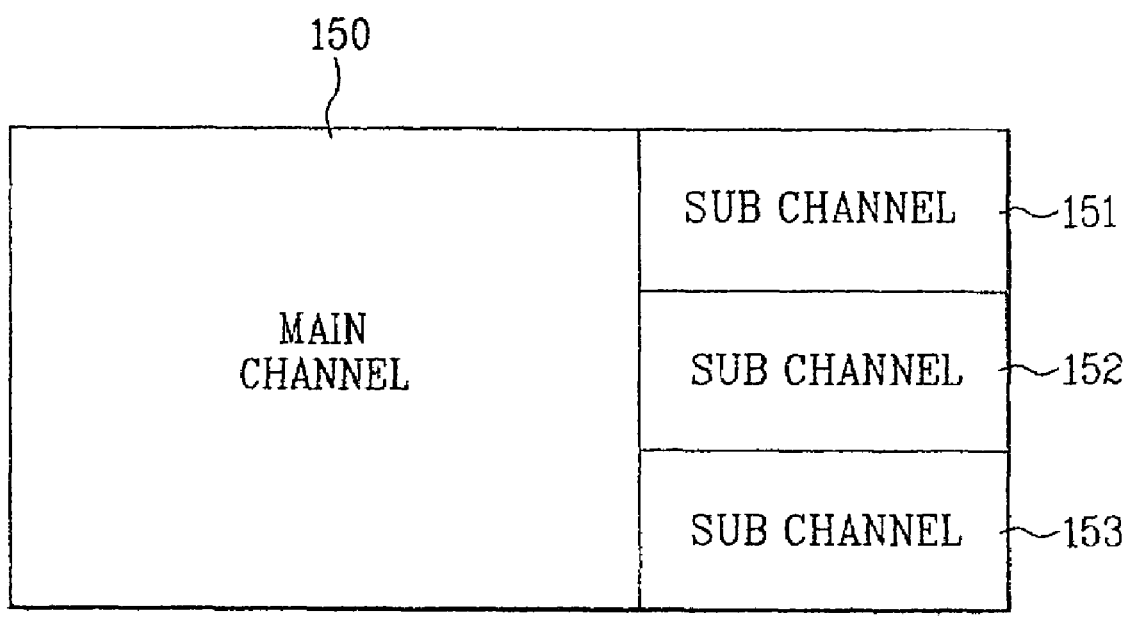
FIG. 4 illustrates an example of a multi-picture operation displaying a main picture and three sub-pictures in accordance with the present invention.
Figure 5:
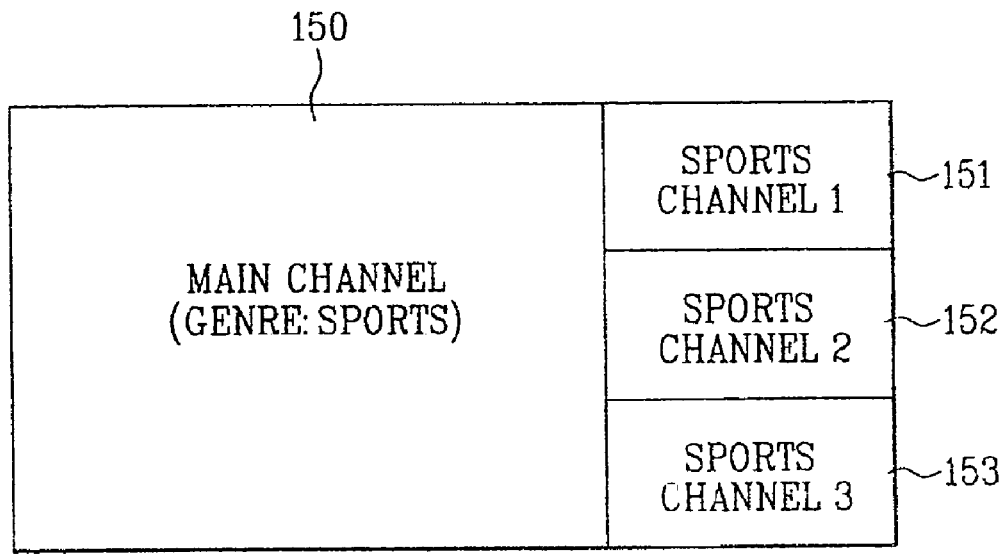
FIG. 5 illustrates another example of a multi-picture operation displaying a main picture and three sub-pictures in accordance with the present invention.
Figure 6:
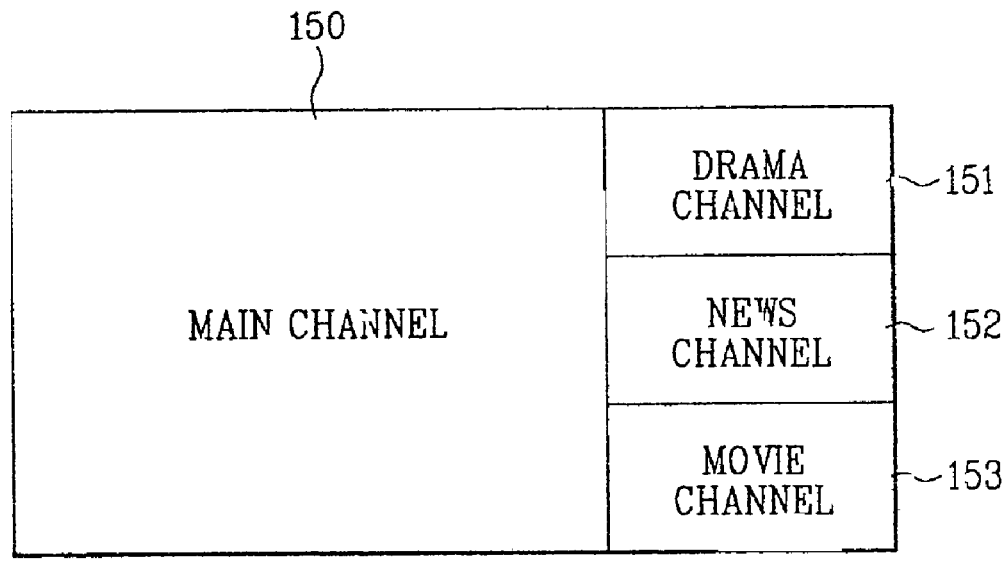
FIG. 6 illustrates another example of a multi-picture operation displaying a main picture and three sub-pictures in accordance with the present invention.

If the user selects the "Special multi-picture option", a sub-menu 202 appears with specific options such as "user's preference", "Same genre", "Different genres", and "OFF". For example, if the option of the "user's preference" is selected, the controller 16 detects the genres or the channels which the user viewed so many times. That is, the controller 16 reads the user's favorite genres or channels from the memory 13 in which the controller 16 stores the user's viewing history, and searches and selects the genres or the channels in the order of the frequency of the user's viewings. As shown in FIG. 4, the controller 16 then displays the programs corresponding to the selected genres or channels on the sub-pictures 151, 152, 153. If the option of the "Same genre" is selected, as shown in FIG. 5, in order to select the programs or the channels to be displayed on the sub-pictures 151, 152, 153, the controller 16 finds out the programs or channels corresponding to the genres to be identical with the genre of the main picture 150. But the controller 16 may not select the broadcasting program or the channel to be identical with the broadcasting program or the channel displayed on the main picture 150. If the option of the "Different genres" is selected in order to predetermine each of the genres of the sub-pictures 151, 152, 153, it will bring another pop-up menu, called "predetermining genre" 203 listing "Screen 1", "Screen 2," and "Screen 3" corresponding to the sub-pictures 151, 152, 153, respectively. As shown in FIG. 6, the user can select the genres of the programs or the channels to be displayed on the sub-pictures 151, 152, 153 by using the menu of the "predetermining genre".

The controller 16 stores the options selected by the user in the memory 13 (S22). When the user desires the multi-picture operation, the controller 16 reads and recognizes the stored user's options from the memory 13 (S23), then performs the multi-picture operation based on the stored user's options.

Recognizing the user's options (S23), the controller 16 identifies the genre information in the received TV broadcast signals and converts the video signals corresponding to the predetermined genres into data representing the displayable sub-pictures based on the genre information. According to the user's options, the controller 16 displays the user's favorite programs or channels on the sub-pictures (S241), displays the programs or channels having the same genre as the main picture's on the sub-pictures (S242), or displays the programs or channels having the different genres from the main channel's on the sub-pictures (S243).

FIG. 4 illustrates an example of a multi-picture operation having a main channel on a main picture 150 and three other channels on sub pictures 151, 152, 153 in accordance with the present invention. To be more specific, FIG. 4 illustrates a main channel on a main picture 150 and a first sub channel, a second channel, and a third channel on a first sub picture 151, a second sub picture 152, and a third sub picture 153. For example, if the user is watching ABC on the main picture 150, the controller 16 displays the user's favorite channels such as MTV, CNN and Discovery channel on the sub-pictures 151, 152, 153, based on the frequency of the user's viewings, FIG. 5 illustrates an example of a multi-picture operation having a same genre as a main channel's in accordance with the present invention. For example, when the user is watching a sports channel on the main picture 150, the controller 16 displays only a first sports channel, a second sports channel, and a third sports channel on the first sub picture 151, the second sub picture 152, the third sub picture 153.

FIG. 6 illustrates an example of the multi-picture operation having different genres from a main channel's in accordance with the present invention. According to FIG. 6, no matter what kind of genre is showing on the main picture 150, the user can select any genres to watch on the sub pictures 151, 152, 153. For example, when a main channel in any genre is showing on the main picture 150, a drama channel, a news channel, and a movie channel can show on the sub-picture 151, 152, 153 according to the genres predetermined by the user.

Accordingly, the apparatus and method for performing the multi-picture operation in the display device according to the present invention provides a sub-picture setting menu for selecting or modifying the genres of the programs or channels to be displayed on the sub-pictures. Therefore, the user can select and modify the genres of the programs or channels to be displayed on the sub-pictures according to his or her preference.

Also, after selecting the genres, the controller searches the programs or the channels corresponding to the selected genres, based on the genre information in the received broadcast signals, automatically displays then the programs or the channels corresponding to the selected genres on the sub-pictures.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for performing a multi-picture in a display device, comprising:
   a tuner that receives a plurality of broadcast signals, which include video signals, audio signals, and supplementary information including user preferred channel information;
   a demodulation device that demodulates the plurality of broadcast signals, which include video signals, audio signals, and supplementary information including user preferred channel information;

a video processor that converts at least one of the video signals into data representing a displayable main picture and data representing one or more displayable sub-pictures; and a controller that selects at least one of the video signals based on the demodulated user preferred channel information, wherein the controller controls the video processor to convert the selected at least one of the video signals which corresponds to at least one user preferred channel into the sub-picture data.

2. The apparatus of claim 1, wherein the video processor comprising:

a main video processor that converts one of the video signals into the main picture data;

one or more supplementary video processors that convert the video signals corresponding to the selected user preferred channels into the sub-picture data; and a multiplexer that combines the main picture data and the sub-picture data according to a control signal of the controller.

3. The apparatus of claim 2, wherein the multiplexer assigns pixel addresses of a display to the main picture data and the sub-picture data.

4. The apparatus of claim 1, wherein the controller provides a user with a sub-picture setting menu for selecting genres of broadcasting programs or channels to be displayed on the sub-pictures.

5. The apparatus of claim 4, wherein the sub-picture setting menu includes a selectable option for selecting a number of the sub-pictures to be displayed.

6. The apparatus of claim 4, wherein the sub-picture setting menu includes a plurality of selectable options for controlling a size and a position of the sub-picture.

7. The apparatus of claim 1, wherein the user preferred channel information is based on a frequency of the user's previous selections of broadcasting programs or channels.

8. The apparatus of claim 1, wherein the user preferred channel information is based on a genre of a broadcasting program or a channel displayed on the main picture.

9. The apparatus of claim 1, further comprising a memory that stores the user preferred channel information.

10. The apparatus of claim 1, further comprising a codec that encodes and decodes the video signals, the audio signals, and the supplementary information.

11. A method of performing a multi-picture in a display device, comprising:

receiving a plurality of broadcast signals, which include video signals, audio signals, and supplementary information including user preferred channel information;

demodulating the plurality of broadcast signals, which include video signals, audio signals, supplementary information including user preferred channel information;

selecting video signals based on the user preferred channel information; and converting one of the received video signals into data representing a displayable main picture and converting the selected video signals into data representing one or more displayable sub-pictures.

12. The method of claim 11, wherein selecting video signals based on the user preferred channel information comprises selecting video signals based on a genre of broadcasting programs or channels to be displayed on the sub-pictures.

13. The method of claim 12, wherein the selecting video signals based on a genre of broadcasting programs or channels to be displayed on the sub-pictures comprising:

providing a user with a sub-picture setting menu for selecting a genre of the broadcasting programs or the channels to be displayed on the sub-pictures; and reviewing the genre selected by a user using the sub-picture setting menu.

14. The method of claim 11, wherein the user preferred channel information is based on a frequency of the user's previous selections of broadcasting programs or channels.

15. The method of claim 12, wherein selecting video signals based on a genre comprises selecting the genre according to a genre of a broadcasting program or a channel displayed on the main picture.

16. The method of claim 13, further comprising storing the selected genre in a memory.

17. The method of claim 11, further comprising selecting a number of the sub-pictures to be displayed.

18. The method of claim 11, further comprising controlling sizes and positions of the sub-pictures.

19. The method of claim 11, further comprising:

assigning pixel addresses of a display unit to the main picture data and the sub-picture data; and combining the main picture data and the sub-picture data according to the pixel addresses.

20. The method of claim 11, further comprising encoding and decoding the detected video signals.

* * * * *